Sept. 18, 1951  G. C. MONTAGUE  2,568,508
MOTOR BLOCK ATTACHING MEANS FOR MOTOR STANDS
Filed Feb. 3, 1949
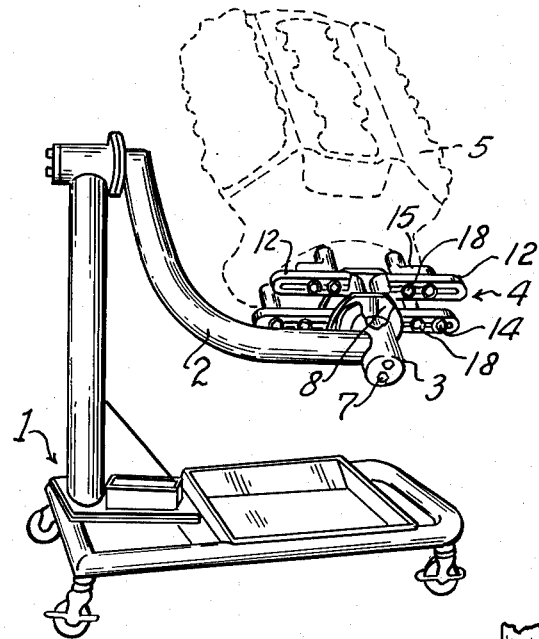
FIG. 1.
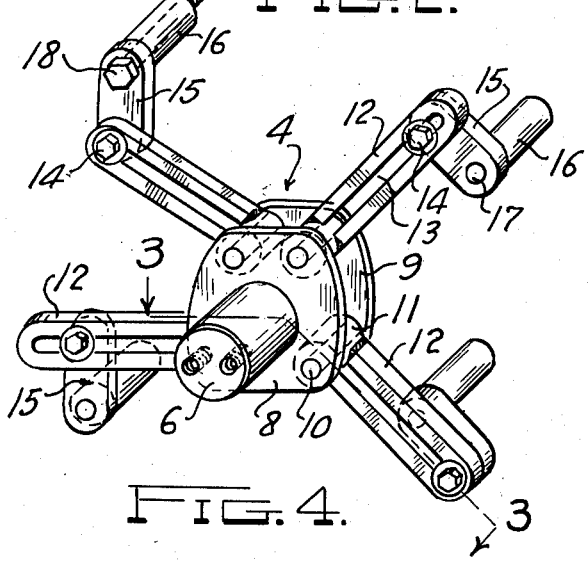
FIG. 2.
FIG. 3.
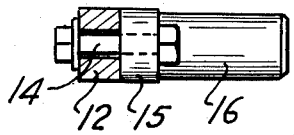
FIG. 4.
INVENTOR.
Gerald C. Montague
BY Owen & Owen
ATTORNEYS Patented Sept. 18, 1951

2,568,508

UNITED STATES PATENT OFFICE 2,568,508

MOTOR BLOCK ATTACHING MEANS FOR MOTOR STANDS

Gerald C. Montague, Urbana, Ohio

Application February 3, 1949, Serial No. 74,410

2 Claims. (Cl. 29—289)

This invention relates to equipment used in connection with the handling of motor blocks during cleaning and repair, and particularly to means for attaching a motor block to a motor stand.

In the use of motor stands, it is customary to attach the transmission end of a motor block to an adjustable arm of the stand so that the block may be swung to various positions. The arm is provided with an attaching means that is secured to the block end by bolts or screws entering customary holes in the block or by casing attaching studs on the block. As these holes or studs are variously positioned for the blocks of different makes of motors, and very frequently for different motors of the same make, it has been necessary to provide a plurality of attaching means so as to accommodate various engines.

The object of the invention is the provision of a universally adjustable adapter for use in attaching motor blocks of various makes and styles to the carrying arms of motor stands irrespective of the positions of the attaching studs or stud-receiving holes in the block.

The invention is fully described in the following specification, and a preferred embodiment thereof illustrated in the accompanying drawings, in which—

Fig. 1 is a perspective elevation of a motor stand with a motor block, shown in dotted lines, attached thereto by the means embodying the invention; Fig. 2 is an enlarged perspective view of the attaching means with the motor block attaching parts thereof adjusted differently from the positions in Fig. 1; Fig. 3 is an enlarged section on the line 3—3 in Fig. 2, with parts broken away and parts in full, and Fig. 4 is a section on the line 4—4 in Fig. 3.

Referring to the drawings, I designates a portable motor stand having a motor-block carrying-arm 2 swingable in a vertical plane and provided at its free end with a bearing head 3 having a socket transverse to the swinging axis of the arm.

The adapter 4 in which the invention resides is shown in Fig. 1 as attaching a motor block 5, shown in dotted lines, to the bearing head 3. This adapter has a center trunnion part 6 for insertion into the bearing head socket of the carrying arm, and in which it is secured by end screws 7. The outer end of this trunnion is provided with a surrounding radial flange 8. A plate 9, corresponding in shape to the flange 8, is secured in axially spaced relation to said flange by screws 10, or other suitable means. Mounted on the screws 10 between the plate and flange are bosses 11 at the inner ends of respective rocker arms 12, which are permitted to have relative rocking movements in a common plane transverse to the axis of the trunnion 6.

Each arm 12 is provided lengthwise thereof with a slot 13 which receives a bolt 14 for clamping a short link member 15 to the arm in any desired position of swinging adjustment about the bolt 14 as an axis. This link is attached to the side of the arm 12 opposed to the trunnion 6 and has a stud 16 projecting at right angles from its opposite side, at its outer end, with its axis parallel to that of the trunnion 6. A bore 17 is provided axially through the stud 16 and link 15 to receive a holding screw 18 for firmly attaching the stud endwise to the motor block end. The screws 18 are engaged in threaded holes provided in the motor block end and such holes also customarily serve to receive the screws for holding the flywheel case to the motor block. As the positions of these screw holes vary in different motors, the arms 12 and links 15 are relatively adjustable to suit the screw hole arrangement for the respective motor block. If the motor block should happen to have rigid attaching studs projecting from its ends, these studs may be inserted through the bores 17 of the attaching links in securing the attachment 4 to the motor block. The attachment 4 in Fig. 1 shows one adjusted arrangement of the arms and links, while Fig. 2 shows another arrangement.

It is apparent that the hub or body member of the attachment, which comprises the trunnion 6, flange 8 and plate 9, is secured to the arm head 3 by inserting the trunnion 6 into the head socket and firmly securing it therein by screws 7. The arms 12 are then swung to proper positions and the links 15 suitably adjusted relative to the arms for the studs 16 to align with certain of the holes in the motor block end and thus permit holding screws 18 to be inserted through the bores 17 in the studs and to be threaded into said holes to rigidly hold the motor block to the attachment. The motor block can now swing with the arm 2 to any position in a vertical plane suitable for performing any desired work thereon.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. An attachment of the class described, comprising a body means for attachment to a mounting member, a plurality of longitudinally slotted arms attached to said means in spaced relation around a center point thereof for relative swinging movements in a common plane, a link having a pivot attachment at one end of each of said arms for sliding adjustment in the link slot and for pivotal adjustment in a plane parallel to that of said arm, a stud projecting laterally from the other end each link sidewise of the arm, and means for attaching each stud in adjusted position to a motor block end.

2. In an attachment of the class described, a trunnion for attachment to a carrying member and having a radial end flange, a plate in transversely spaced parallel relation to said flange, a plurality of pivot members connecting said flange and plate in spaced relation, arms mounted on said pivot members between said flange and plate for relative swinging movements in a plane parallel thereto, a link having a pivot attachment at one end of each of said arms for longitudinal and swinging adjustment relative thereto in said plane, a stud projecting from the other end of each of said links transverse thereto and having an axial bore therethrough for receiving means for attaching the stud to a motor block.

GERALD C. MONTAGUE.

REFERENCES CITED

The following references are of record in the file of this patent:

UNITED STATES PATENTS

| Number | Name | Date |
|---|---|---|
| 288,035 | Dixon | Nov. 6, 1883 |
| 755,403 | Sipe | Mar. 22, 1904 |
| 1,336,912 | Manley | Apr. 13, 1920 |
| 1,363,020 | Shewalter | Dec. 21, 1920 |
| 1,445,079 | Hammond et al. | Feb. 13, 1923 |
| 1,721,424 | Whightsil | July 16, 1929 |
| 2,328,987 | Martin | Sept. 7, 1943 |
| 2,446,331 | Staab et al. | Aug. 31, 1948 |